(12) United States Patent
Sawada et al.

(10) Patent No.: US 9,111,682 B2
(45) Date of Patent: Aug. 18, 2015

(54) MULTILAYER CERAMIC ELECTRONIC COMPONENT

(75) Inventors: Takashi Sawada, Nagaokakyo (JP); Shigekatsu Yamamoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/354,374

(22) Filed: Jan. 20, 2012

(65) Prior Publication Data

US 2013/0020905 A1  Jan. 24, 2013

(30) Foreign Application Priority Data

Jan. 21, 2011 (JP) .................................. 2011-010669

(51) Int. Cl.
*H01G 4/012* (2006.01)
*H01G 4/30* (2006.01)
*H01G 4/232* (2006.01)

(52) U.S. Cl.
CPC ............... *H01G 4/012* (2013.01); *H01G 4/232* (2013.01); *H01G 4/30* (2013.01)

(58) Field of Classification Search
CPC .......... H01G 4/012; H01G 4/30; H01G 4/232
USPC .......................................... 361/321.2, 306.3
See application file for complete search history.

(56) References Cited

U.S. PATENT DOCUMENTS

| | | | | |
|---|---|---|---|---|
| 6,400,553 B2 * | 6/2002 | Yoshii et al. | ................ | 361/321.2 |
| 6,654,227 B2 * | 11/2003 | Miki et al. | ................. | 361/321.2 |
| 6,661,640 B2 * | 12/2003 | Togashi | ..................... | 361/306.3 |
| 7,420,795 B2 * | 9/2008 | Togashi et al. | ............. | 361/306.3 |
| 7,605,683 B2 * | 10/2009 | Sawada et al. | .................... | 338/2 |
| 7,646,586 B2 * | 1/2010 | Togashi | ..................... | 361/306.3 |
| 2005/0046536 A1 * | 3/2005 | Ritter et al. | ................... | 336/200 |
| 2005/0201040 A1 * | 9/2005 | Ahiko et al. | ............... | 361/321.2 |
| 2007/0205514 A1 | 9/2007 | Togashi | | |
| 2008/0080122 A1 | 4/2008 | Togashi et al. | | |

(Continued)

FOREIGN PATENT DOCUMENTS

EP  1 594 353 A1  11/2005
EP  1 783 790 A1  5/2007

(Continued)

OTHER PUBLICATIONS

Official Communication issued in corresponding Japanese Patent Application No. 2011-010669, mailed on Jan. 15, 2013.

*Primary Examiner* — David M Sinclair
(74) *Attorney, Agent, or Firm* — Keating & Bennett, LLP

(57) ABSTRACT

In a multilayer ceramic electronic component, internal electrodes arranged inside a ceramic body include exposed ends that are connected to end surfaces of the ceramic body. External electrodes, which are arranged on the end surfaces so as to be electrically connected to the internal electrodes, include first conductive portions that are arranged on the end surfaces so as to cover the exposed ends but so as not to wrap around onto the side surfaces, and include second conductive portions that are arranged on the end surfaces so as to cover the first conductive portions and so as to wrap around onto the principal surfaces and the side surfaces. In each external electrode, protruding portions are arranged on the end surface adjacent to the first conductive portion to stabilize the posture of the ceramic body when the second conductive portions are being formed.

8 Claims, 19 Drawing Sheets

(56) References Cited

U.S. PATENT DOCUMENTS

| | | |
|---|---|---|
| 2008/0128860 A1 | 6/2008 | Sawada et al. |
| 2009/0052114 A1* | 2/2009 | Motoki et al. ............. 361/306.3 |
| 2009/0154055 A1* | 6/2009 | Takashima et al. ........ 361/301.4 |
| 2009/0323253 A1* | 12/2009 | Kobayashi et al. ........ 361/301.4 |

FOREIGN PATENT DOCUMENTS

| | | | |
|---|---|---|---|
| EP | 2 065 908 A1 | | 6/2009 |
| JP | 10-303066 A | | 11/1998 |
| JP | 2001185449 A | * | 7/2001 |
| JP | 2002-305127 A | | 10/2002 |
| JP | 2004-259736 A | | 9/2004 |
| JP | 2004-265929 A | | 9/2004 |
| JP | 2005175165 A | * | 6/2005 |
| JP | 2005-236161 A | | 9/2005 |
| JP | 2007-013029 A | | 1/2007 |
| JP | 2007-096215 A | | 4/2007 |
| JP | 2007-234903 A | | 9/2007 |
| JP | 2008-282891 A | | 11/2008 |
| JP | 2008300769 A | * | 12/2008 |
| JP | 2009-088420 A | | 4/2009 |
| JP | 2009-111422 A | | 5/2009 |
| JP | 2009218353 A | * | 9/2009 |
| JP | 2010-186902 A | | 8/2010 |
| WO | 2006/022258 A1 | | 3/2006 |
| WO | 2008/035727 A1 | | 3/2008 |

* cited by examiner

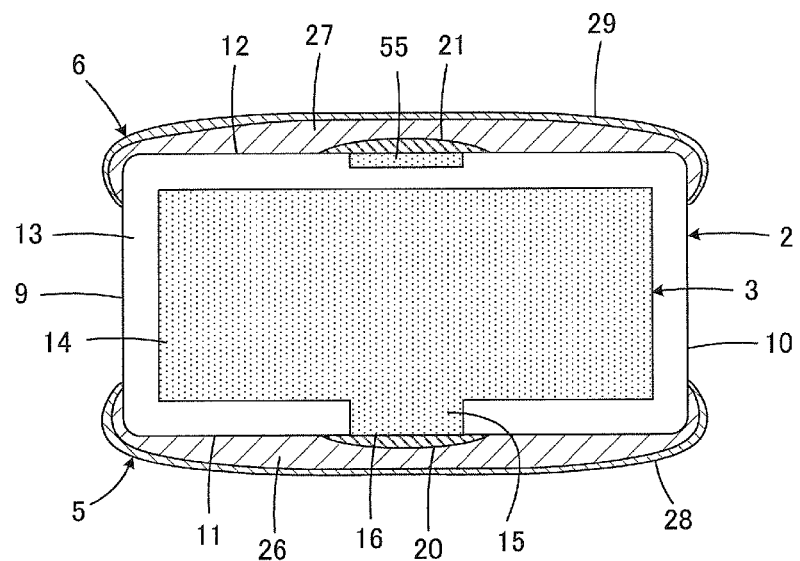
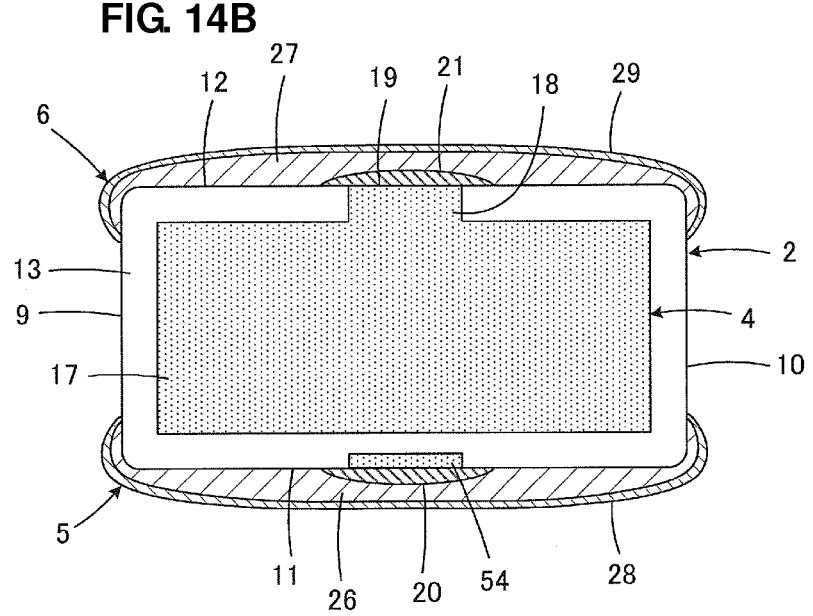

MULTILAYER CERAMIC ELECTRONIC COMPONENT

BACKGROUND OF THE INVENTION

1. Field of the Invention

The present invention relates to multilayer ceramic electronic components and in particular relates to the structure of an external electrode of a multilayer ceramic electronic component.

2. Description of the Related Art

In a power supply circuit of a circuit board on which a high-end LSI chip is mounted, if there are large fluctuations in voltage in a power supply line due to impedances that exist in the power supply line and the ground, the operation of a circuit that is being driven becomes unstable, interference occurs between circuits via the power supply circuit, and oscillations are generated.

Accordingly, typically, a decoupling capacitor is connected in parallel between the power supply line and the ground in order to solve this problem. Such a decoupling capacitor, together with eliminating parasitic noise in the power supply line, swiftly supplies charge to a load when fluctuations occur in the power supply voltage (quick power supply) and thereby stabilizes operation of the circuit. It is necessary to arrange an equivalent series inductance (ESL) low-value capacitor in the vicinity of the LSI chip to realize the above-described quick power supply, and for example, often an ESL low-value multilayer ceramic capacitor is arranged on the LSI package.

In line with the decreasing size and increasing capacitance of multilayer ceramic capacitors in recent years, there has been a tendency for internal electrodes of multilayer ceramic capacitors to be become increasingly thinner, for the number of stacked layers of internal electrodes to increase and for the ESL and equivalent series resistance (ESR) of multilayer ceramic capacitors to become lower. Consequently, for example, there has been a problem in that as a result of the ESR of a capacitor on an LSI package becoming too low, the impedance at a parallel resonance (anti-resonance) point generated between the capacitor and the very small capacitance of the LSI chip becomes high.

In other words, in a power supply circuit in which a plurality of decoupling capacitors, which have different electrostatic capacitances (intrinsic resonant frequencies), are connected in parallel with one another, if the ESR of a certain capacitor becomes too low, there is a problem in that the decoupling function in a certain frequency band will be degraded due to the influence of anti-resonance.

In response to this, for example, a way of increasing ESR by forming a resistance electrode layer, which is electrically connected to an internal electrode, in an external electrode serving as a terminal of a capacitor, has been proposed in PCT International Publications of Patent Application Nos. WO2006/022258 and WO2008/035727.

In the methods described in PCT International Publications of Patent Application Nos. WO2006/022258 and WO2008/035727, a resistance electrode layer is formed by applying a paste containing a resistive component to a ceramic body and forming an external electrode layer so as to cover the resistance electrode layer. In addition, such a resistance electrode layer is formed so as to wrap around from an end surface of the ceramic body onto adjacent side surfaces via corner portions.

However, when a resistance electrode layer wraps around onto a side surface, it is necessary that an external electrode layer wrap around onto the side surface by a greater amount in order to cover the resistance electrode layer. In this case, there has been a problem in that the distance from the edge of the wrapped around portion of the external electrode layer to the edge of the wrapped around portion of the resistance electrode layer becomes short and it becomes easy for moisture that has entered from between the edge of the wrapped around portion of the external electrode layer and the ceramic body to penetrate to the resistance electrode layer.

This kind of problem is encountered not only in capacitors that include resistance electrode layers as a measure to counter an increased ESR as described above, but also may be encountered in any multilayer ceramic electronic component in which an external electrode has a structure including two or more layers.

SUMMARY OF THE INVENTION

Accordingly, preferred embodiments of the present invention provide a multilayer ceramic electronic component that solves the above-described problems.

A multilayer ceramic electronic component according to a preferred embodiment of the present invention includes a ceramic body that includes a pair of opposing principal surfaces, a pair of opposing side surfaces and a pair of opposing end surfaces, and that includes a plurality of ceramic layers that extend in a direction in which the principal surfaces extend and are stacked in a direction of a line that connects the pair of principal surfaces; an internal electrode that is arranged inside the ceramic body and that includes a led out portion that provides an exposed end that is exposed at a corresponding one of the end surfaces; and an external electrode that is arranged on the end surface so as to be electrically connected to the internal electrode.

It is preferable that the external electrode includes a first conductive portion and a second conductive portion that covers the first conductive portion. The first conductive portion is arranged on the end surface of the ceramic body so as to cover the exposed end of the led out portion of the internal electrode and so as not to wrap around onto the side surfaces of the ceramic body. The second conductive portion is arranged on the end surface of the ceramic body so as to cover the first conductive portion and so as to wrap around onto the principal surfaces and the side surfaces of the ceramic body.

It is preferable that the external electrode further include a protruding portion that is arranged on the end surface of the ceramic body so as to be adjacent to the first conductive portion with a predetermined distance therebetween, and that the second conductive portion be arranged so as to cover the first conductive portion and the protruding portion.

It is preferable that on a single one of the end surfaces, there is one first conductive portion and a plurality of protruding portions, and that the plurality of protruding portions be arranged at positions that are symmetric to each other about the first conductive portion serving as a center.

In addition, it is preferable that a thickness of the protruding portion in a direction of a line that connects the pair of end surfaces be equal to or larger than a thickness of the first conductive portion.

Furthermore, the protruding portion is preferably made of the same material as the first conductive portion, for example. In this case, it is preferable that the multilayer ceramic electronic component further include a dummy electrode that is arranged inside the ceramic body, that includes an exposed end that is exposed at the end surface and is covered by the protruding portion, and that is made of the same material as the internal electrode.

The material forming the first conductive portion preferably contains a resistive component.

In addition, it is preferable that a dimension of the end surfaces in a direction of a line that connects the pair of side surfaces is longer than a dimension of the side surfaces in the direction of a line that joins the pair of end surfaces and the present preferred embodiment of the present invention is advantageously applied to a multilayer ceramic electronic component.

In addition, it is preferable that a plurality of the internal electrodes, which are arranged in a direction in which the ceramic layers of the ceramic body are stacked, be provided, the internal electrodes each including an opposing portion, the opposing portions of the internal electrodes opposing one another and the opposing portions each being connected to the corresponding led out portion, and that a width dimension of the led out portion be smaller than a width dimension of the opposing portion. The present preferred embodiment of the present invention is advantageously applied to a multilayer ceramic electronic component.

According to various preferred embodiments of the present invention, the first conductive portion of the external electrode preferably does not wrap around onto the side surfaces of the ceramic body and therefore the area over which the first conductive portion extends can be made small. In addition, the second conductive portion of the external electrode wraps around not only the end surfaces of the ceramic body but also wraps around onto the principal surfaces and the side surfaces of the ceramic body. Thus, it is possible to make the distance from the edge of the wrapped around portion of the second conductive portion to the edge of the first conductive portion comparatively long, and therefore penetration of moisture that has entered from between the edge of the wrapped around portion of the second conductive portion and the ceramic body toward the first conductive portion can be prevented and suppressed.

In addition, the second conductive portion of the external electrode, as described above, is preferably arranged so as to wrap around not only the end surfaces of the ceramic body but so as also to wrap around onto the principal surfaces and the side surfaces of the ceramic body and therefore the strength with which the external electrode is fixed to the ceramic body is improved.

In the present preferred embodiment of the present invention, when a protruding portion is arranged on the end surface of ceramic body so as to be adjacent to the first conductive portion, it is possible to ensure that the posture of the ceramic body is stable when the end surface of the ceramic body is pressed toward a plate or a surface plate. That is, if the first conductive portion was formed on the end surface without the protruding portion being arranged adjacent thereto on the end surface, it is possible that the following problems could arise.

After formation of the first conductive portion, in a case where an end surface of the ceramic body is made to adhere to an adhesive plate or the like and an attempt is made to move the ceramic body, when the first conductive portion, which is provided on only a portion of the end surface, contacts the adhesive plate, the ceramic body will become tilted.

If the second conductive portion is formed using a dip method, when the first conductive portion, which is formed on only a portion of the end surface, is pushed against a surface plate, the ceramic body will become tilted.

When the above-described problems occur, there is a risk that the shape in which the second conductive portion will be applied will be unsatisfactory.

In contrast, when the protruding portion is arranged on the end surface of the ceramic body so as to be adjacent to the first conductive portion, the posture of the ceramic body is stabilized by the protruding portion and therefore the above-described problems do not arise.

In particular, if, on each single one of the end surfaces, a plurality of protruding portions are arranged at positions that are symmetric to each other about the first conductive portion serving as a center, and the thickness of the protruding portions in the direction of a line that connects the pair of end surfaces is equal to or greater than a thickness of the first conductive portion, the effects due to the protruding portions can be more markedly exhibited.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3A illustrates a cross section through which a first internal electrode passes and FIG. 3B illustrates a cross section through which a second internal electrode passes.

FIG. 6A illustrates a state in which the ceramic body contacts a horizontal placement surface such as an adhesive plate or a surface plate while being held by a holder, and FIG. 6B illustrates a state that exists after the ceramic body on the horizontal placement surface has been released from the holder.

FIGS. 14A and 14B illustrate a multilayer ceramic capacitor, which is an example of a multilayer ceramic electronic component according to a ninth preferred embodiment of the present invention, and are figures that correspond to FIGS. 13A and 13B.

FIG. 18A illustrates a cross section through which a first internal electrode passes, FIG. 18B illustrates a cross section through which a second internal electrode passes and FIG. 18C illustrates a cross section through which an outer layer dummy electrode passes.

DETAILED DESCRIPTION OF THE PREFERRED EMBODIMENTS

Figure 1:
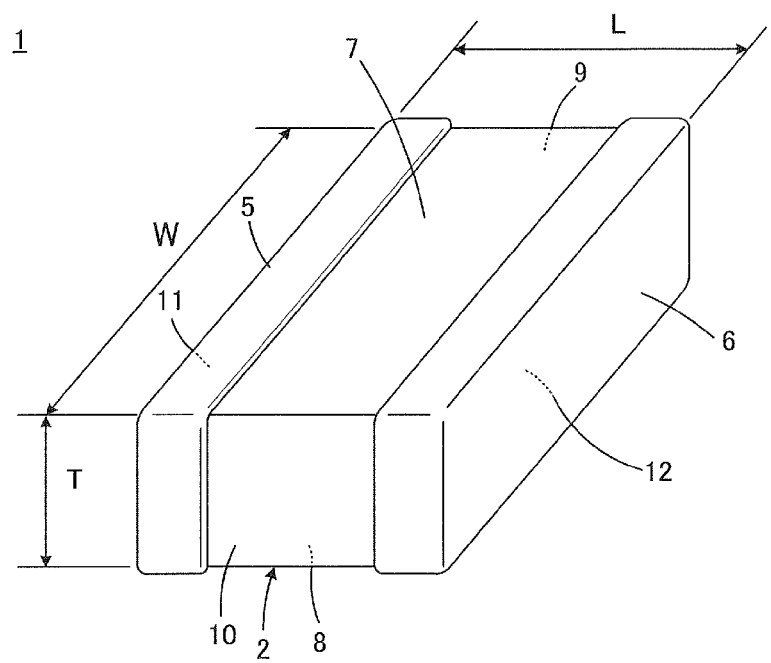
FIG. 1 is a perspective view illustrating the exterior of a multilayer ceramic capacitor, which is an example of a multilayer ceramic electronic component according to a first preferred embodiment of the present invention.

Hereafter, multilayer ceramic capacitors will be described as examples of a multilayer ceramic electronic component in order to explain preferred embodiments of the present invention.

First Preferred Embodiment

FIGS. 1 to 6 will be used to describe a first preferred embodiment of the present invention. A multilayer ceramic capacitor 1 according to the first preferred embodiment is an ESR controlling capacitor. The multilayer ceramic capacitor 1 includes a ceramic body 2, internal electrodes 3 and 4, which are arranged inside the ceramic body 2, and external electrodes 5 and 6, which are arranged on outer surfaces of the ceramic body 2. Hereafter, the structure of the multilayer ceramic capacitor 1 will be described in detail by separately describing the ceramic body, the internal electrodes, and the external electrodes. After that, a method of manufacturing the multilayer ceramic capacitor 1 will be described.

As illustrated in FIGS. 1 to 5, the ceramic body 2 preferably has a substantially rectangular parallelepiped shape including a pair of opposing principal surfaces 7 and 8, a pair of opposing side surfaces 9 and 10, and a pair of opposing end surfaces 11 and 12. It is preferable that the ceramic body 2 include rounded corner portions and edge portions.

Figure 2:
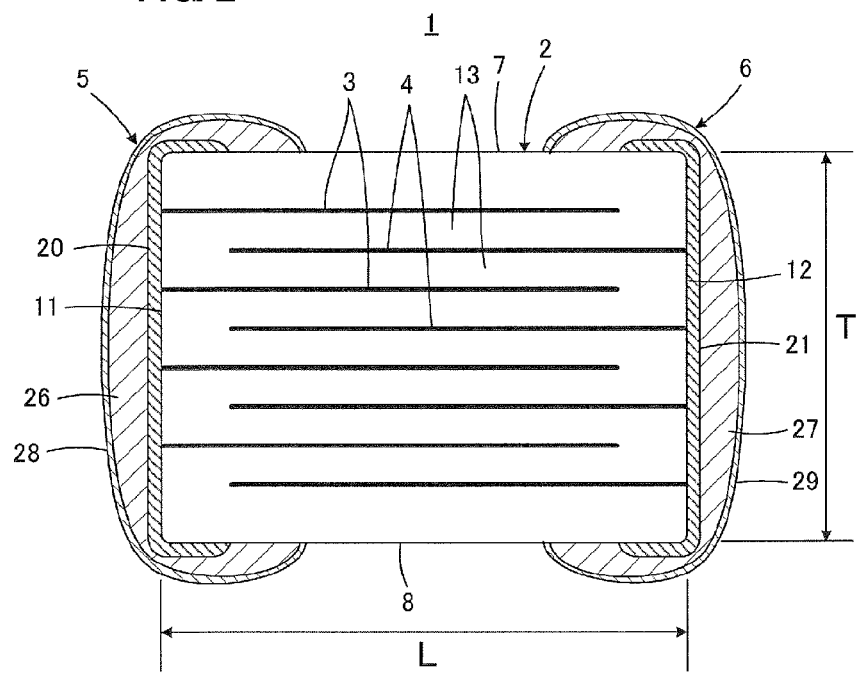
FIG. 2 is a sectional view of the multilayer ceramic capacitor illustrated in FIG. 1 taken along a plane parallel to a side surface of a ceramic body.

The ceramic body 2, as illustrated in FIG. 2, has a multilayer structure including a plurality of ceramic layers 13 that extend in a direction parallel or substantially parallel to the principal surfaces 7 and 8 and are stacked on top of one another in the direction of a line that connects the pair of principal surfaces 7 and 8. The thickness of each ceramic layer 13 is preferably about 0.5 µm to about 10 µm, for example. As a ceramic material of the ceramic layers 13, for example, a dielectric ceramic having $BaTiO_3$, $CaTiO_3$, $SrTiO_3$, or $CaZrO_3$ as a main component can be used. In addition, a dielectric ceramic obtained by adding a sub-component of, for example, a Mn compound, a Mg compound, a Si compound, a Co compound, an Ni compound or a rare earth element compound to one of the above-described main components may be used.

The ceramic body 2 is a so-called LW inverted type body in which a dimension W of the end surfaces 11 and 12 in the direction of a line that connects the pair of side surfaces 9 and 10 is larger than a dimension L of the side surfaces 9 and 10 in the direction of a line that connects the pair of end surfaces 11 and 12. In such an LW inverted type body, since the length of the internal electrodes 3 and 4 can be made small and the width of the internal electrodes 3 and 4 can be made large, the ESL of the multilayer ceramic capacitor 1 can be made small. It is preferable that the dimension W be about 1.5 times to about 2.5 times the dimension L, for example.

With such an LW inverted type body, since the ceramic body 2 may easily become tilted, the existence of protruding portions to be described later is important.

Figure 3A:
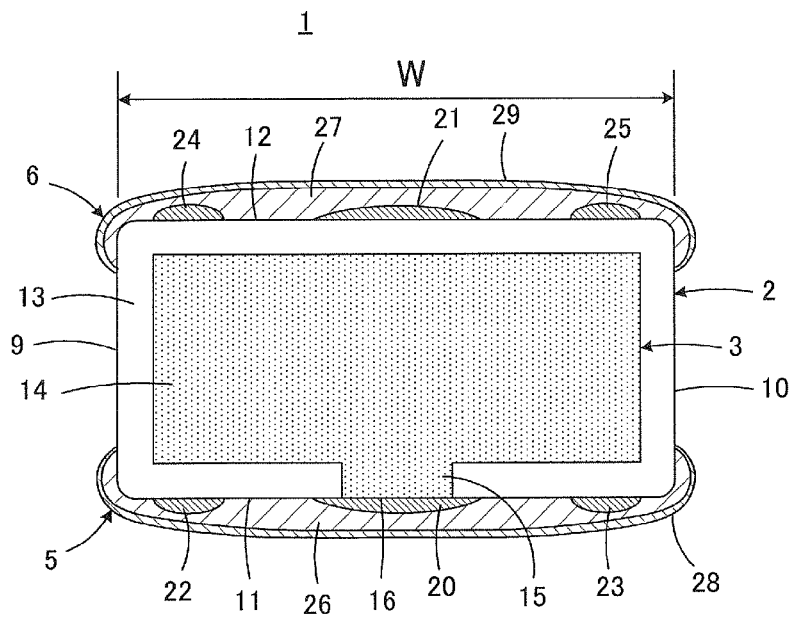
FIGS. 3A and 3B are sectional views of the multilayer ceramic capacitor illustrated in FIG. 1 taken along a plane parallel to a principal surface of a ceramic body, where
Figure 3B:
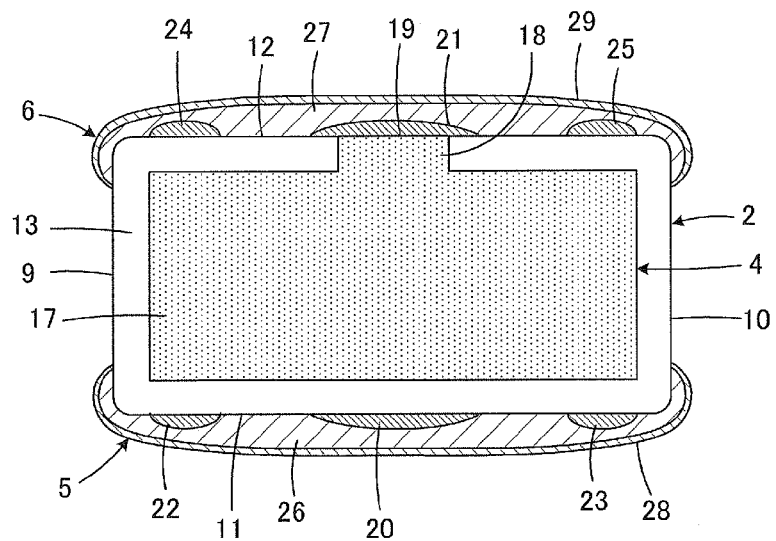

The internal electrodes include a plurality of first internal electrodes 3 illustrated in FIG. 3A and a plurality of second internal electrodes 4 illustrated in FIG. 3B. The plurality of first internal electrodes 3 and the plurality of second internal electrodes 4 are alternately arranged in the direction in which the ceramic layers 13 of the ceramic body 2 are stacked.

The first internal electrodes 3 each include an opposing portion 14 that opposes the second internal electrodes 4 adjacent thereto and a led out portion 15 that is led out from the opposing portion 14 to a first end surface 11. The led out portion 15 provides an exposed end 16 that is exposed at the end surface 11. On the other hand, the second internal electrodes 4 each include an opposing portion 17 that opposes the first internal electrodes 3 adjacent thereto and a led out portion 18 that is led out from the opposing portion 17 to a second end surface 12. The led out portion 18 provides an exposed end 19 that is exposed at the end surface 12.

It is preferable that a width dimension of each of the led out portions 15 and 18 be smaller than a width dimension of each of the opposing portions 14 and 17. Thus, it is easy to ensure that the exposed ends 16 and 19 are respectively covered with certainty by first conductive portions, which will be described later, of the external electrodes 5 and 6 and reliability is secured. In addition, as a result of there being the above-described dimensional relationships, it becomes easier to make a current path narrower, whereby it is possible to make the ESR of the capacitor high.

As conductive materials for forming the internal electrodes 3 and 4, for example, Ni, Cu, Ag, Pd, Ag—Pd alloys and Au can preferably be used.

In addition, it is preferable that the thickness of each of the internal electrodes 3 and 4 be about 0.3 µm to about 2.0 µm, for example.

The external electrodes 5 and 6 each preferably include a first conductive portion, protruding portions, a second conductive portion and a third conductive portion. Hereafter, each of these components will be described.

Figure 4:
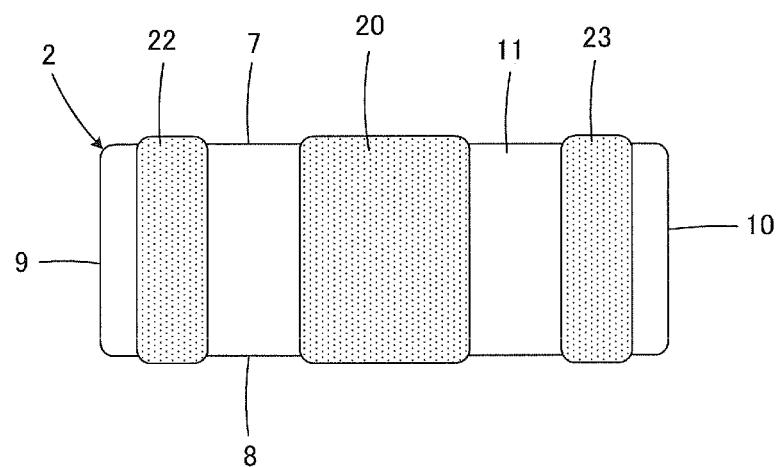
FIG. 4 is an end surface view illustrating a state in which a first conductive portion has been formed on the ceramic body included in the multilayer ceramic capacitor illustrated in FIG. 1.
Figure 5:
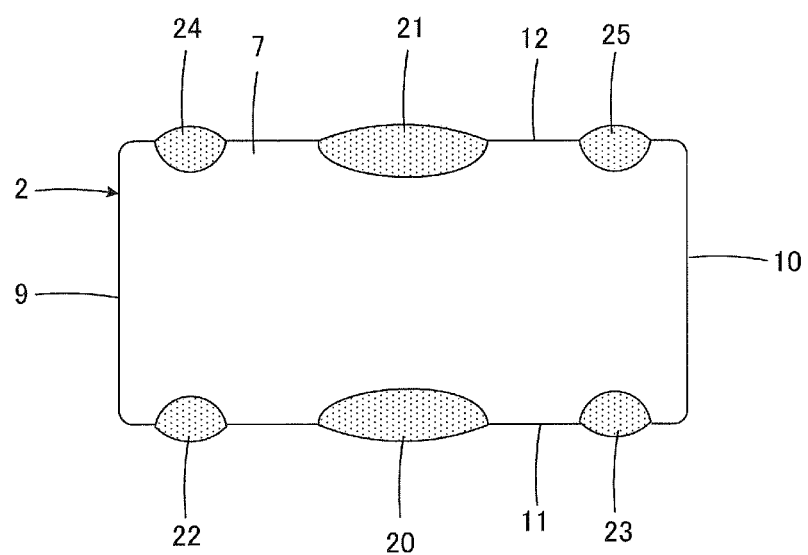
FIG. 5 is plan view illustrating a state in which the first conductive portion has been formed on the ceramic body included in the multilayer ceramic capacitor illustrated in FIG. 1.

As illustrated in FIGS. 3 to 5, first conductive portions 20 and 21 are respectively arranged on the end surfaces 11 and 12 of the ceramic body 2 so as to cover the exposed ends 16 and 19 of the led out portions 15 and 18 of the internal electrodes 3 and 4. The first conductive portions 20 and 21 preferably have a substantially band-shaped configuration arranged to wrap around onto the principal surfaces 7 and 8 but not to wrap around onto the side surfaces 9 and 10.

Each of the first conductive portions 20 and 21 may have a width dimension of about ½ W or less, for example, with respect to a dimension W in the direction of a line that connects the pair of side surfaces 9 and 10. In addition, the first conductive portions 20 and 21 may be arranged so as to respectively pass through the centers of the end surfaces 11 and 12 with respect to the direction of a line that connects the pair of side surfaces 9 and 10. In particular, with this arrangement of the first conductive portions 20 and 21, the ceramic body 2 easily becomes tilted and therefore the existence of protruding portions to be described in detail later is important. It is preferable that the thickness of each of the first conductive portions 20 and 21 be about 5 µm to about 100 µm, for example.

In this preferred embodiment, the first conductive portions 20 and 21 each include a resistive component. Thus, by inserting a resistive element so as to be in series with a capacitance provided by the multilayer ceramic capacitor 1, the ESR of the multilayer ceramic capacitor 1 can be made high. The ESR of the multilayer ceramic capacitor 1 is preferably a value of about 10 mΩ to about 1500 mΩ and more preferably a value of about 100 mΩ to about 1000 mΩ, for example. In addition, the resistivities of the first conductive portions 20 and 21 are preferably about 0.001 Ωcm to about 1.0 Ωcm and more preferably about 0.005 Ωcm to about 0.1 Ωcm, for example.

The above-mentioned term "resistive component" refers to a component having a comparatively high resistivity other than metals and glasses included in general outer terminal electrodes and is preferably a metallic oxide other than a glass. Here, as a metallic oxide, for example, a complex oxide such as an In—Sn complex oxide (ITO), a La—Cu complex oxide, a Sr—Fe complex oxide, or a Ca—Sr—Ru complex oxide may be effectively used. Since these complex oxides have excellent reactivity with Ni, when such a complex oxide is used, it is preferable that Ni or a Ni alloy be used as a conductive material for the above-described internal electrodes 3 and 4. Thus, the reliability of connection between the external electrodes 5 and 6, in particular, first conductive portions 20 and 21, and the internal electrodes 3 and 4 can be made high.

In addition to the resistive component, a glass can be added to the first conductive portions 20 and 21. Here, as such a glass, a B—Si-based glass, a B—Si—Zn-based glass, a B—Si—Zn—Ba-based glass, or a B—Si—Zn—Ba—Al-based glass can be used. When a glass is added, the volume ratio of the resistive component to the glass is preferably in the range of about 30:70 to about 70:30, for example.

A metal such as Ni, Cu, Mo, Cr or Nb or a metallic oxide such as $Al_2O_3$, $TiO_2$, $ZrO_2$ or ZnO may be additionally added to the first conductive portions 20 and 21. These materials have a function of adjusting the resistivity and a function of adjusting the compactness of the first conductive portions 20 and 21. In other words, when one of the above-described metals is added, the resistivity is reduced, and when one of the above-described metallic oxides is added, the resistivity is increased. In addition, Ni, Cu, $Al_2O_3$, and $TiO_2$ increase densification of the first conductive portions 20 and 21 and on the other hand Mo, Cr, Nb, $ZrO_2$ and ZnO decrease the densification of the first conductive portions 20 and 21. The term "reduction of densification" implies that the generation of blisters caused by excessive sintering of the first conductive portions 20 and 21 will be prevented.

Although not illustrated, a plurality of the first conductive portions may be provided on a single end surface.

As illustrated in FIGS. 3 and 4, protruding portions 22 and 23 and protruding portions 24 and 25 are respectively arranged on the end surfaces 11 and 12 so as to be adjacent to the first conductive portions 20 and 21 with predetermined distances therebetween. The protruding portions 22 to 25 act so as to prevent the ceramic body 2 from becoming tilted when second conductive portions, which are to be described in detail later, are formed. The protruding portions 22 to 25 preferably have substantially band-shaped configurations so as to wrap around onto the principal surfaces 7 and 8. Each of the protruding portions 22 to 25 may have a width dimension of about ¼ W or less, with respect to a dimension W in the direction of a line that connects the pair of side surfaces 9 and 10.

In this preferred embodiment, the two protruding portions 22 and 23 are arranged on the one end surface 11 with the first conductive portion 20 interposed therebetween and the two protruding portions 24 and 25 are arranged on the other end surface 12 with the first conductive portion 21 interposed therebetween. Thus, the effectiveness with which the ceramic body 2 is prevented from becoming tilted is increased.

In addition, the two protruding portions 22 and 23 are arranged at positions that are symmetrical with each other about the first conductive portion 20 serving as a center. Similarly, the two protruding portions 24 and 25 are arranged at positions that are symmetrical with each other about the first conductive portion 21 serving as a center. Here, the distances between the first conductive portion 20 and each of the protruding portions 22 and 23 are substantially equal and the distances between the first conductive portion 21 and each of the protruding portions 24 and 25 are substantially equal. Thus, the effectiveness with which the ceramic body 2 is prevented from becoming tilted is further increased.

The protruding portions 22 to 25 are preferably formed of the same material as the first conductive portions 20 and 21. Thus, the protruding portions 22 to 25 can be formed at the same time as the first conductive portions 20 and 21. Alternatively, the protruding portions 22 to 25 may be formed of a material different from that of the first conductive portions 20 and 21. For example, the protruding portions 22 to 25 may be formed of a mixture of a ceramic material and a glass component.

It is preferable that the thickness of each of the protruding portions 22 to 25 be about 5 µm to about 100 µm, for example, in the direction of a line that connects the pair of end surfaces 11 and 12, it is preferable that the thickness of each of the protruding portions 22 and 23 be substantially the same as or greater than the thickness of the first conductive portion 20 and furthermore it is preferable that the thickness of each of the protruding portions 24 and 25 be substantially the same as or greater than the thickness of the first conductive portion 21. This contributes to more effectively preventing the ceramic body 2 from becoming tilted.

Furthermore, it is preferable that the width of each of the protruding portions 22 and 23 in the direction of a line connecting the pair of side surfaces 9 and 10 be substantially equal to or less than the width of the first conductive portion 20, and similarly that the width of each of the protruding portions 24 and 25 be substantially the same as or less than the width of the first conductive portion 21. If the width of each of the protruding portions 22 and 23 is substantially the same as the width of the first conductive portion 20, it becomes easier to make the thickness of each of the protruding portions 22 and 23 and the thickness of the first conductive portion 20 match each other, and furthermore if the width of each of the protruding portions 24 and 25 is substantially the same as the width of the first conductive portion 21, it becomes easier to make the thickness of each of the protruding portions 24 and 25 and the thickness of the first conductive portion 21 match each other.

Instead, three or more protruding portions or just a single protruding portion may be provided on a single end surface.

A second conductive portion 26 is arranged on the end surface 11 so as to cover the first conductive portion 20 and the protruding portions 22 and 23, and similarly a second conductive portion 27 is arranged on the end surface 12 so as to cover the first conductive portion 21 and the protruding portions 24 and 25. In addition, these second conductive portions 26 and 27 are arranged so as to wrap around onto the principal surfaces 7 and 8 and the side surfaces 9 and 10.

The second conductive portions 26 and 27 act so as to improve moisture resistance. In particular, when the first conductive portions 20 and 21 include a metallic oxide or a glass component as a main component, the first conductive portions 20 and 21 are more likely to be porous and therefore the importance of the second conductive portions 26 and 27 is increased.

As will be described below, in the case where the third conductive portions are formed by plating, the second conductive portions 26 and 27 act to improve strength with which the plating is attached.

As a conductive material included in the second conductive portions 26 and 27, for example, Cu, Ni, Ag, Pd, an Ag—Pd alloy or Au can be used. In addition, it is preferable that a glass component be added to the second conductive portions 26 and 27. As the glass component, it is preferable that a glass component be used that is the same as or includes a main component the same as the glass that may be included in the first conductive portions 20 and 21.

It is preferable that the material forming the second conductive portions 26 and 27, and the material forming the first conductive portions 20 and 21 and the material forming the protruding portions 22 to 25 be different from each other. Thus, the first conductive portions 20 and 21 and the second conductive portions 26 and 27 can be assigned different roles.

It is preferable that the thickness of each of the second conductive portions 26 and 27 be about 5 μm to about 100 μm, for example.

As illustrated in FIG. 2 and FIG. 3, third conductive portions 28 and 29 are respectively formed by performing plating so as to cover the second conductive portions 26 and 27, if necessary.

In the case where the multilayer ceramic capacitor 1 is to be mounted by using solder, it is preferable that the third conductive portions 28 and 29 each include a two-layer structure including a Ni plating film and a Sn plating film disposed on the Ni plating film. In the case where the multilayer ceramic capacitor 1 is to be mounted by using a conductive adhesive or wire bonding, it is preferable that the third conductive portions 28 and 29 each have a two-layer structure including a Ni plating film and a Au plating film disposed on the Ni plating film. In the case where the multilayer ceramic capacitor 1 is to be embedded in a resin substrate, it is preferable that at least the outermost layer of each of the third conductive portions 28 and 29 be a Cu plating film.

The third conductive portions 28 and 29 need not have a two-layer structure as described above and may instead have a single layer structure or a structure having three or more layers.

It is preferable that the thickness of each plating film included in the third conductive portions 28 and 29 be about 1 μm to about 10 μm, for example.

A stress-relaxing conductive resin layer may be disposed between the second conductive portion 26 and the third conductive portion 28 and between the second conductive portion 27 and the third conductive portion 29.

For example, the multilayer ceramic capacitor 1 is manufactured as follows.

Ceramic green sheets, which will become the ceramic layers 13, an internal electrode conductive paste and an external electrode conductive paste are prepared. A binder and a solvent is included in the ceramic green sheets and in the internal electrode conductive paste and external electrode conductive paste, and a known organic binder and an organic solvent can be used. In addition, as the external electrode conductive paste, a conductive paste for the first conductive portions 20 and 21 and the protruding portions 22 to 25, and a conductive paste for the second conductive portions 26 and 27 are prepared.

On the ceramic green sheets, internal electrode patterns are formed preferably by printing a conductive paste in predetermined patterns by for example screen printing.

A mother multilayer body is manufactured by stacking a predetermined number of ceramic green sheets for outer layers on which internal electrode patterns have not been not printed, sequentially stacking ceramic green sheets thereon on which internal electrode patterns have been printed, and stacking thereon a predetermined number of ceramic green sheet for outer layers.

The mother multilayer body is subjected to pressing in the stacking direction thereof preferably by using an apparatus such as an isostatic press.

Raw ceramic bodies are cut out by cutting the mother multilayer body into pieces of a predetermined size. At this time, corner portions and edge portions of the raw ceramic bodies may be subjected to rounding by, for example, performing barrel polishing.

The raw ceramic bodies are fired. Thus, the illustrated ceramic body 2 is obtained. The firing temperature depends on the materials used for the ceramic layers and the internal electrodes but is preferably about 900° C. to about 1300° C., for example.

The first conductive portions 20 and 21 and the protruding portions 22 to 25 are formed preferably by applying conductive paste for forming the first conductive portions 20 and 21 and the protruding portions 22 to 25 to the end surfaces 11 and 12 of the fired ceramic body 2 and then performing sintering. In this case, a slit method can be adopted in which the ceramic body 2 is made to contact a slit and conductive paste is applied in a substantially band-shaped configuration by being caused to pass through the slit. Thus, the first conductive portion 20 and the protruding portions 22 and 23 can be formed simultaneously and the first conductive portion 21 and the protruding portions 24 and 25 can preferably be formed simultaneously. The temperature at which sintering is performed is preferably about 700° C. to about 900° C., for example. In addition, as the atmosphere used during sintering, an atmosphere such as air or $N_2$ is preferably used, for example.

The second conductive portions 26 and 27 are preferably formed by applying conductive paste for forming the second conductive portions 26 and 27 onto the first conductive portions 20 and 21 and then performing sintering. In this case, a dip method can be adopted in which the ceramic body 2 is made to contact a surface plate on which a paste has been spread and is then lifted out. It is preferable that the sintering temperature be in the range of about 700° C. to about 900° C., for example, and be a temperature lower than the temperature used when sintering the first conductive portions 20 and 21 and the protruding portions 22 to 25 described above. In addition, as the atmosphere used during sintering, an atmosphere such as air or $N_2$ is preferably used, for example.

As has been described above, when the ceramic body 2 is made to contact the surface plate, not only the first conductive portions 20 and 21 but also the protruding portions 22 to 25 contact the surface plate and therefore the ceramic body 2 can be prevented from becoming tilted. This will be described below with reference to FIGS. 6A and 6B.

If necessary, the third conductive portions 28 and 29 are preferably formed by plating on the second conductive portions 26 and 27.

Through the above steps, manufacture of the multilayer ceramic capacitor 1 is completed.

Next, a problem that occurs when the protruding portions 22 to 25 are not provided will be described with reference to FIGS. 6A and 6B.

Figure 6A:
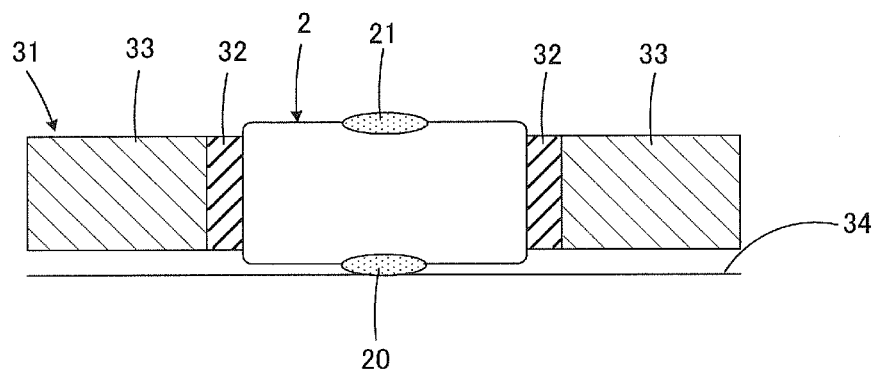
FIGS. 6A and 6B are diagrams for explaining a problematic point in a case where the protruding portions illustrated in FIG. 4 and FIG. 5 are not provided, where

A state is illustrated in FIG. 6A in which the ceramic body 2 is held by a holder 31. The holder 31 includes rigid bodies 33 on the inner sides of which elastic bodies 32 are provided and the ceramic body 2 is held by being sandwiched between the rigid bodies 33 while the elastic bodies 32 are in pressing contact with the ceramic body 2. On the illustrated ceramic body 2, the first conductive portions 20 and 21 have been provided but no protruding portions have been provided.

Figure 6B:
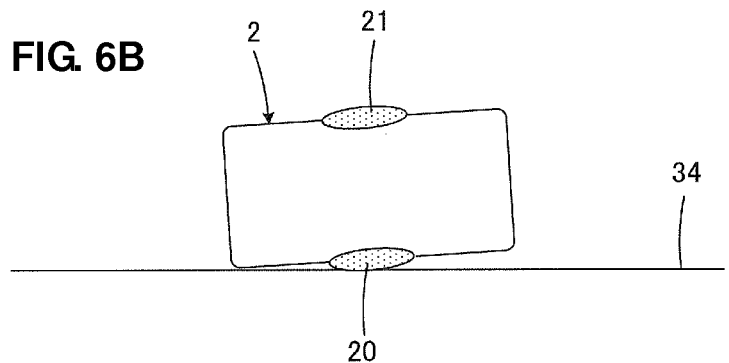

As illustrated in FIG. 6A, the ceramic body 2 is made to contact a horizontal placement surface 34 such as an adhesive plate or a surface plate while being held by the holder 31, and then as illustrated in FIG. 6B, when the ceramic body 2 on the horizontal placement surface 34 is released from the holder 31, since there are no protruding portions on the ceramic body 2, the posture of the ceramic body 2 is unstable and the ceramic body 2 becomes tilted.

If the ceramic body 2 becomes tilted in this way, for example, there is a risk that the shapes of the applied conductive paste for forming the second conductive portions 26 and 27 in the above-described step will be degraded. In contrast, when the protruding portions 22 to 25 are arranged on the ceramic body 2 so as to be adjacent to the first conductive portions 20 and 21, the posture of the ceramic body 2 is stabilized by the protruding portions 22 to 25 and therefore it is possible to ensure that the above-described problem does not occur.

Second Preferred Embodiment

Figure 7:
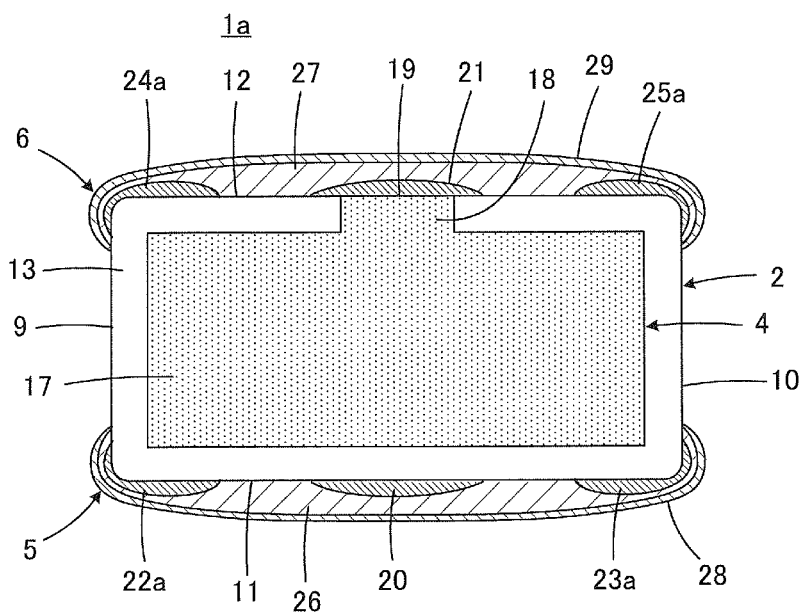
FIG. 7 illustrates a multilayer ceramic capacitor, which is an example of a multilayer ceramic electronic component according to a second preferred embodiment of the present invention, and is a figure that corresponds to FIG. 3B.

A second preferred embodiment of the present invention is illustrated in FIG. 7. FIG. 7 corresponds to FIG. 3B. In FIG. 7, elements corresponding to those illustrated in FIG. 3B are denoted by the same reference symbols and repetitious description thereof will be omitted.

In a multilayer ceramic capacitor 1a illustrated in FIG. 7, protruding portions 22a to 25a are arranged so as to wrap around not only the end surfaces 11 and 12 but also so as to wrap around onto at least the side surfaces 9 and 10. Although not illustrated, the protruding portions 22a to 25a may be arranged so as to wrap around onto the principal surfaces 7 and 8.

With this configuration, although moisture may more easily penetrate to the protruding portions 22a to 25a, even if moisture does penetrate to the protruding portions 22a to 25a, since the exposed ends 16 and 19 of the internal electrodes 3 and 4 are not positioned underneath the protruding portions 22a to 25a, this is not a serious problem.

Third Preferred Embodiment

Figure 8:
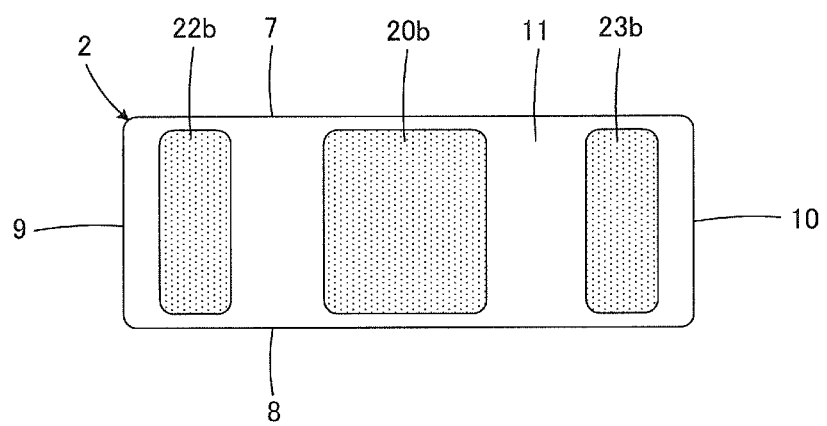
FIG. 8 illustrates a ceramic body included in a multilayer ceramic capacitor, which is an example of a multilayer ceramic electronic component according to a third preferred embodiment of the present invention, and is a figure that corresponds to FIG. 4.

A third preferred embodiment of the present invention is illustrated in FIG. 8. FIG. 8 corresponds to FIG. 4. In FIG. 8, elements corresponding to those illustrated in FIG. 4 are denoted by the same reference symbols and repetitious description thereof will be omitted.

A first conductive portion 20b and protruding portions 22b and 23b are disposed only on the end surface 11 of the ceramic body 2 illustrated in FIG. 8. Regarding a first conductive portion and protruding portions on the rear surface side, that is, the end surface 12 of the ceramic body 2 illustrated in FIG. 8, although not illustrated, they are provided only on the end surface 12.

With this configuration, the thickness of the external electrodes in the direction T (refer to FIG. 1 and FIG. 2) can be restrained and therefore the profile of the multilayer ceramic electronic component can be reduced.

Fourth Preferred Embodiment

Figure 9:
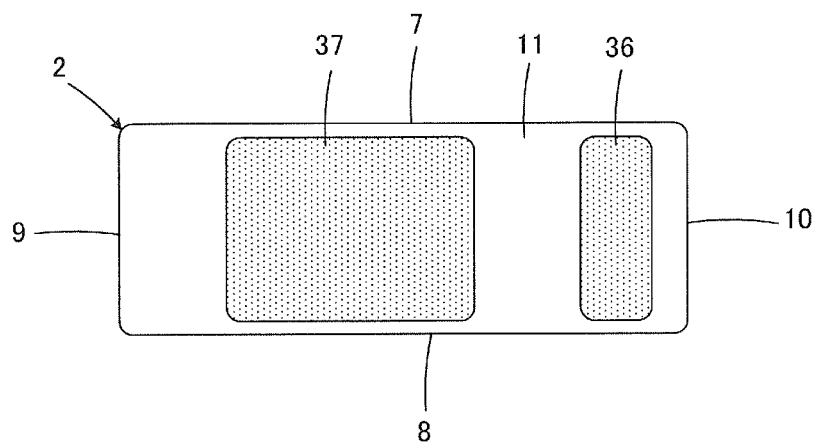
FIG. 9 illustrates a ceramic body included in a multilayer ceramic capacitor, which is an example of a multilayer ceramic electronic component according to a fourth preferred embodiment of the present invention, and is a figure that corresponds to FIG. 4.

A fourth preferred embodiment of the present invention is illustrated in FIG. 9. FIG. 9 corresponds to FIG. 4. In FIG. 9, elements corresponding to those illustrated in FIG. 4 are denoted by the same reference symbols and repetitious description thereof will be omitted.

Only a single protruding portion 36 is arranged on one side of the end surface 11 of the ceramic body 2 illustrated in FIG. 9. Regarding a first conductive portion and a protruding portion on the rear surface side, that is, the end surface 12 of the ceramic body 2 illustrated in FIG. 9, although not illustrated, they preferably have the same shapes as those on the end surface 11, but may instead have different shapes.

Shapes like those illustrated in FIG. 9 can be adopted in a situation where a first conductive portion 37 is to have a comparatively large area and is to be arranged so as to be biased in the direction W (refer to FIGS. 1 and 3).

Fifth Preferred Embodiment

Figure 10:
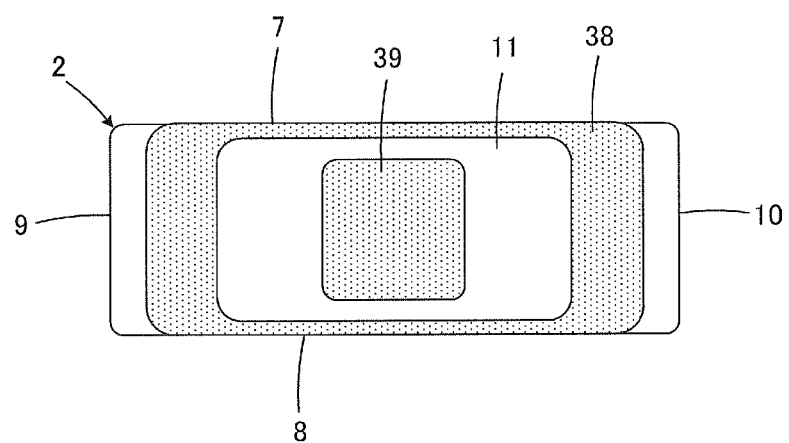
FIG. 10 illustrates a ceramic body included in a multilayer ceramic capacitor, which is an example of a multilayer ceramic electronic component according to a fifth preferred embodiment of the present invention, and is a figure that corresponds to FIG. 4.

A fifth preferred embodiment of the present invention is illustrated in FIG. 10. FIG. 10 corresponds to FIG. 4. In FIG. 10, elements corresponding to those illustrated in FIG. 4 are denoted by the same reference symbols and repetitious description thereof will be omitted.

On the end surface 11 of the ceramic body 2 illustrated in FIG. 10, a protruding portion 38 is arranged in a substantially frame-shaped configuration and a first conductive portion 39 is arranged so as to be surrounded by the protruding portion 38. Regarding a first conductive portion and a protruding portion on the rear surface side, that is, the end surface 12 of the ceramic body 2 illustrated in FIG. 10, although not illustrated, they preferably have the same shapes as those on the end surface 11, but may instead have different shapes.

Sixth Preferred Embodiment

Figure 11:
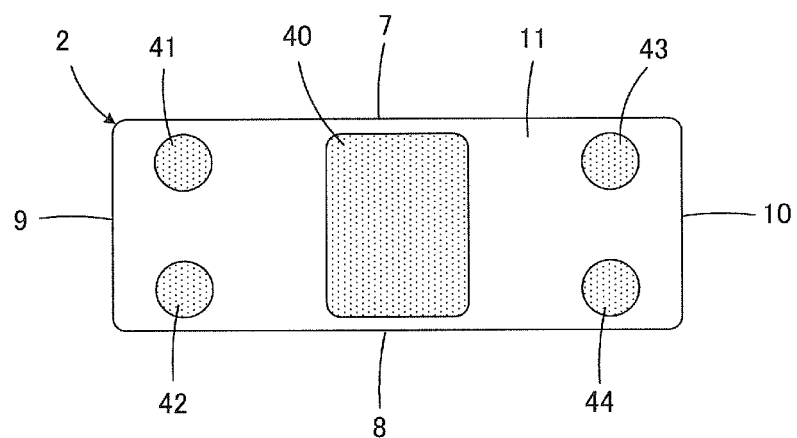
FIG. 11 illustrates a ceramic body included in a multilayer ceramic capacitor, which is an example of a multilayer ceramic electronic component according to a sixth preferred embodiment of the present invention, and is a figure that corresponds to FIG. 4.

A sixth preferred embodiment of the present invention is illustrated in FIG. 11. FIG. 11 corresponds to FIG. 4. In FIG.

11, elements corresponding to those illustrated in FIG. 4 are denoted by the same reference symbols and repeated description thereof will be avoided.

On the ceramic body 2 illustrated in FIG. 11, a first conductive portion 40 is arranged in the center of the end surface 11 and four protruding portions 41 to 44 are arranged in the vicinities of the four corners of the end surface 11. Regarding a first conductive portion and protruding portions on the rear surface side, that is, the end surface 12 of the ceramic body 2 illustrated in FIG. 11, although not illustrated, they preferably have the same shapes as those on the end surface 11, but may instead have different shapes.

Seventh Preferred Embodiment

Figure 12:
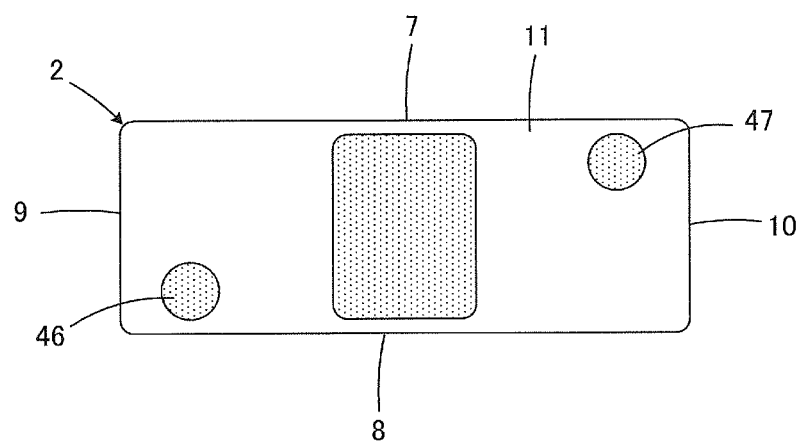
FIG. 12 illustrates a ceramic body included in a multilayer ceramic capacitor, which is an example of a multilayer ceramic electronic component according to a seventh preferred embodiment of the present invention, and is a figure that corresponds to FIG. 4.

A seventh preferred embodiment of the present invention is illustrated in FIG. 12. FIG. 12 corresponds to FIG. 4. In FIG. 12, elements corresponding to those illustrated in FIG. 4 are denoted by the same reference symbols and repeated description thereof will be avoided.

In the ceramic body 2 illustrated in FIG. 12, a first conductive portion 45 is arranged in the center of the end surface 11 and two protruding portions 46 and 47 are arranged at diagonally opposite positions on the end surface 11. Regarding a first conductive portion and protruding portions on the rear surface side, that is, the end surface 12 of the ceramic body 2 illustrated in FIG. 12, although not illustrated, they have the same shapes as those on the end surface 11, but may instead have different shapes.

Eighth Preferred Embodiment

Figure 13A:
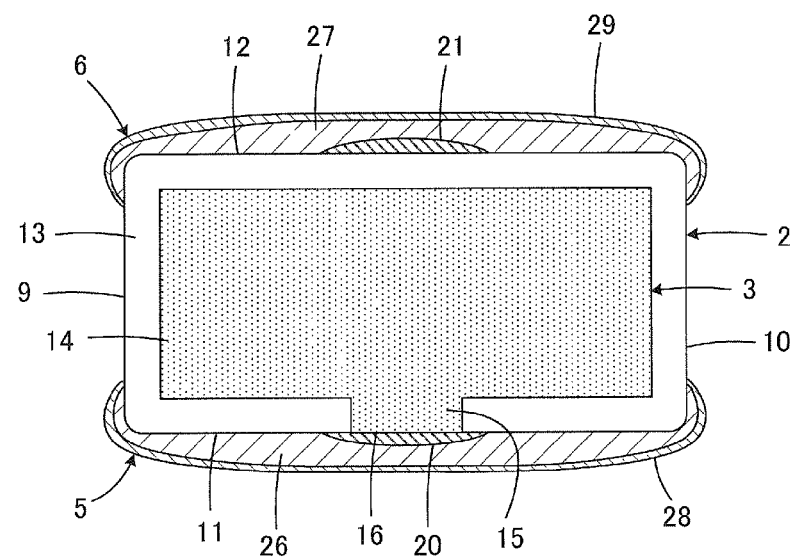
FIGS. 13A and 13B illustrate a multilayer ceramic capacitor, which is an example of a multilayer ceramic electronic component according to an eighth preferred embodiment of the present invention, and are figures that correspond to FIGS. 3A and 3B.
Figure 13B:
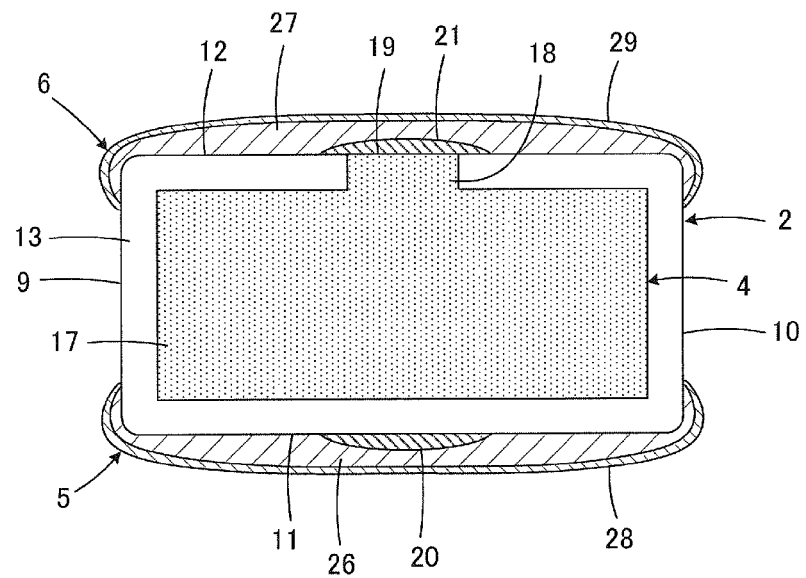

An eighth preferred embodiment of the present invention is illustrated in FIGS. 13A and 13B. FIGS. 13A and 13B correspond to FIGS. 3A and 3B. In FIGS. 13A and 13B, elements corresponding to those illustrated in FIGS. 3A and 3B are denoted by the same reference symbols and repeated description thereof will be avoided.

A multilayer ceramic capacitor 1c illustrated in FIGS. 13A and 13B has a structure obtained by removing the protruding portions 22 to 25 from the multilayer ceramic capacitor 1 illustrated in FIGS. 3A and 3B.

Ninth Preferred Embodiment

A ninth preferred embodiment of the present invention is illustrated in FIGS. 14A and 14B. FIGS. 14A and 14B correspond to FIGS. 13A and 13B. In FIGS. 14A and 14B, elements corresponding to those illustrated in FIGS. 13A and 13B are denoted by the same reference symbols and repeated description thereof will be avoided.

A multilayer ceramic capacitor 1d illustrated in FIGS. 14A and 14B, preferably has a structure obtained by adding dummy electrodes 54 and 55 to the multilayer ceramic capacitor 1 illustrated in FIGS. 3A and 3B.

The dummy electrodes 54 and 55 are arranged so as to be exposed at the end surfaces 11 and 12 of the ceramic body 2. The dummy electrodes 54 and 55 may be formed of the same material as the internal electrodes 3 and 4, for example.

The dummy electrodes 54 and 55 are respectively connected to the first conductive portions 20 and 21. Thus, the dummy electrodes 54 and 55 function so as to improve the strength with which the first conductive portions 20 and 21 are fixed to the ceramic body 2 and consequently function so as to improve the strength with which the external electrodes 5 and 6 are fixed to the ceramic body 2. Therefore, the dummy electrodes 54 and 55 do not significantly contribute to the manifestation of the electrical characteristics of the multilayer ceramic capacitor 1d.

It is preferable that the dummy electrodes 54 and 55 have the same width dimension (dimension in the direction W) as the led out portions 15 and 18 of the internal electrodes 3 and 4. In addition, it is preferable that exposed ends of the dummy electrodes 54 and 55 respectively line up with the exposed ends 16 and 19 of the internal electrodes 3 and 4 in the direction T (refer to FIGS. 1 and 2).

Tenth Preferred Embodiment

Figure 15A:
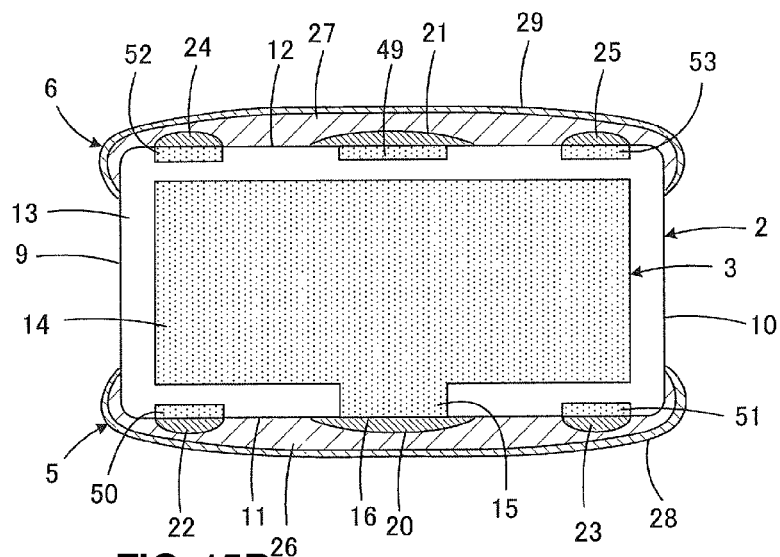
FIGS. 15A and 15B illustrate a multilayer ceramic capacitor, which is an example of a multilayer ceramic electronic component according to a tenth preferred embodiment of the present invention, and are figures that correspond to FIGS. 3A and 3B.
Figure 15B:
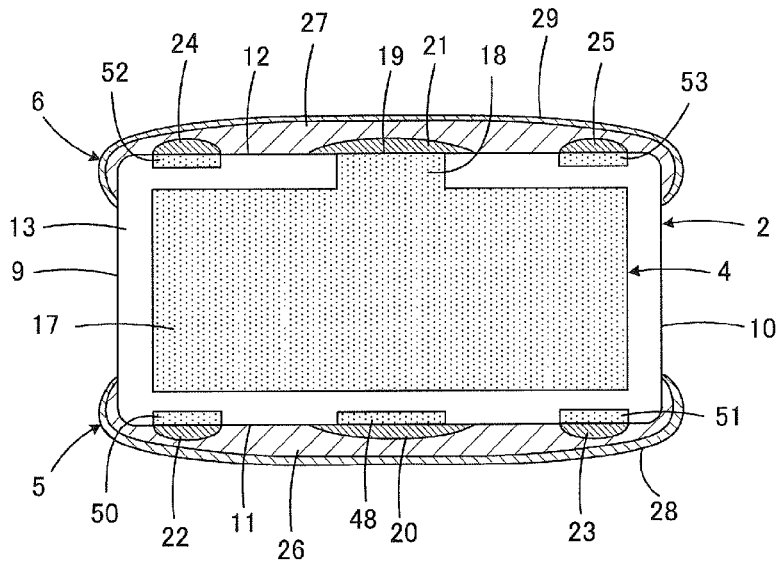

A tenth preferred embodiment of the present invention is illustrated in FIGS. 15A and 15B. FIGS. 15A and 15B correspond to FIGS. 3A and 3B. In FIGS. 15A and 15B, elements corresponding to those illustrated in FIGS. 3A and 3B are denoted by the same reference symbols and repeated description thereof will be avoided.

A multilayer ceramic capacitor 1e illustrated in FIGS. 15A and 15B, preferably has a structure obtained by adding dummy electrodes 48 to 53 to the multilayer ceramic capacitor 1 illustrated in FIGS. 3A and 3B.

The dummy electrodes 48 to 53 are arranged so as to be exposed at the end surfaces 11 and 12 of the ceramic body 2. The dummy electrodes 48 to 53 can be formed of the same material as the internal electrodes 3 and 4, for example.

Among the dummy electrodes 48 to 53, the dummy electrodes 48 and 49 are respectively connected to the first conductive portions 20 and 21 and the dummy electrodes 50 to 53 are respectively connected to the protruding portions 22 to 25. Thus, the dummy electrodes 48 to 53 function so as to improve the strength with which the first conductive portions 20 and 21 and the protruding portions 22 to 25 are fixed to the ceramic body 2 and consequently function so as to improve the strength with which the external electrodes 5 and 6 are fixed to the ceramic body 2. Therefore, the dummy electrodes 48 to 53 do not significantly contribute to the manifestation of the electrical characteristics of the multilayer ceramic capacitor 1e.

It is preferable that the dummy electrodes 48 and 49, which are respectively connected to the first conductive portions and 21, have the same width dimension (dimension in the direction W) as the led out portions 15 and 18 of the internal electrodes 3 and 4. In addition, it is preferable that exposed ends of the dummy electrodes 48 and 49 respectively line up with the exposed ends 16 and 19 of the internal electrodes 3 and 4 in the direction T (refer to FIGS. 1 and 2).

It is preferable that the exposed ends of the dummy electrodes 50 to 53, which are respectively connected to the protruding portions 22 to 25, line up with the end surfaces 11 and 12 in the direction T.

Eleventh Preferred Embodiment

Figure 16:
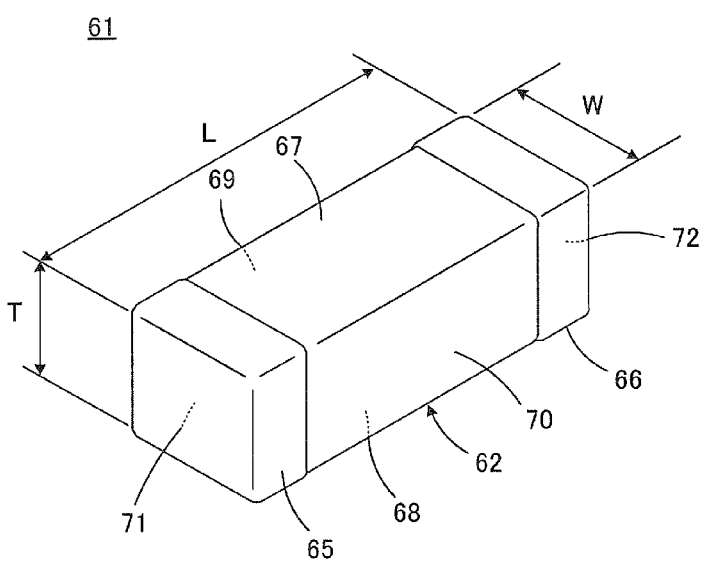
FIG. 16 is a perspective view illustrating the exterior of a multilayer ceramic capacitor, which is an example of a multilayer ceramic electronic component according to an eleventh preferred embodiment of the present invention.
Figure 17:
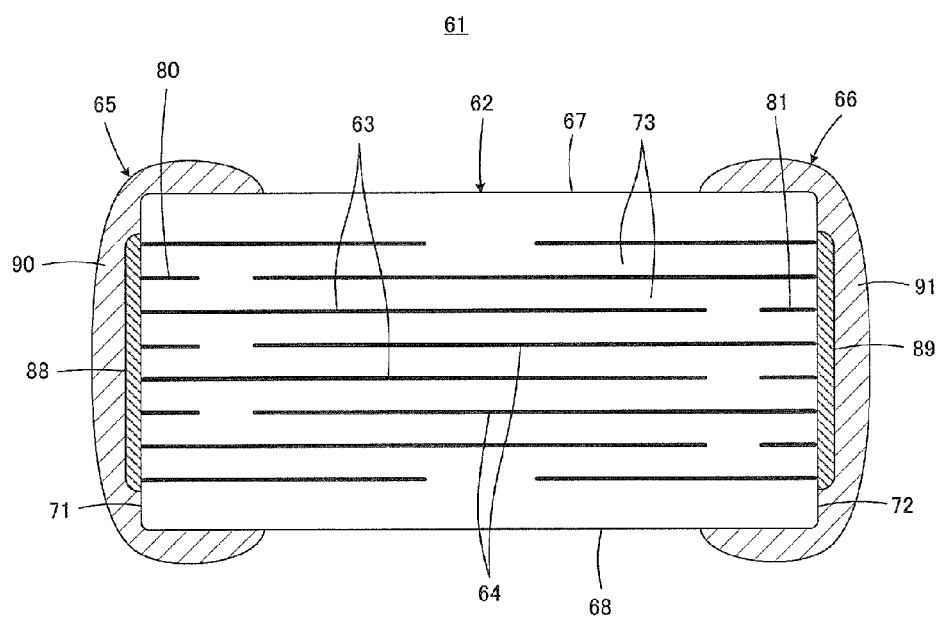
FIG. 17 is a sectional view of the multilayer ceramic capacitor illustrated in FIG. 16 taken along a plane parallel to a side surface of the ceramic body.

FIGS. 16 to 18 will be used to describe an eleventh preferred embodiment of the present invention. In a multilayer ceramic capacitor 61 according to the eleventh preferred embodiment, a conductive adhesive can be used. The multilayer ceramic capacitor 61 includes a ceramic body 62, internal electrodes 63 and 64, which are arranged inside the ceramic body 62, and external electrodes 65 and 66, which are arranged on outer surfaces of the ceramic body 62. Hereafter, the structure of the multilayer ceramic capacitor 61 will be described in detail by separately describing the ceramic body, the internal electrodes, and the external electrodes.

As illustrated in FIGS. 16 to 18, the ceramic body 62 preferably has a substantially rectangular parallelepiped shape including a pair of opposing principal surfaces 67 and 68, a pair of opposing side surfaces 69 and 70, and a pair of opposing end surfaces 71 and 72. It is preferable that the ceramic body 62 include rounded corner portions and edge portions.

The ceramic body 62, as illustrated in FIG. 17, has a multilayer structure including a plurality of ceramic layers 73 that extend in a direction parallel or substantially parallel to the principal surfaces 67 and 68 and are stacked on top of one another in the direction of a line that connects the pair of principal surfaces 67 and 68. The thickness and material of each of the ceramic layers 73 can be the same as those in the above-described first preferred embodiment.

In the ceramic body 62, a dimension W of the end surfaces 71 and 72 in the direction of a line that connects the pair of side surfaces 69 and 70 is smaller than a dimension L of the side surfaces 69 and 70 in the direction of a line that connects the pair of end surfaces 71 and 72.

Figure 18A:
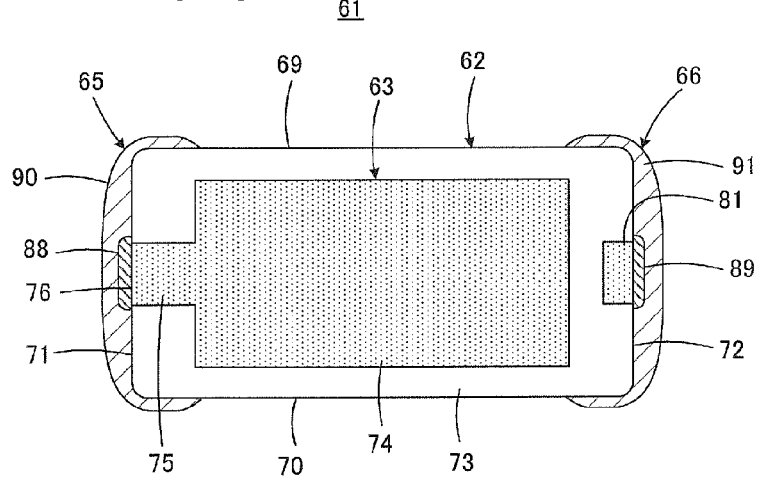
FIGS. 18A to 18C are sectional views of the multilayer ceramic capacitor illustrated in FIG. 16 taken along planes parallel to a principal surface of the ceramic body, where
Figure 18B:
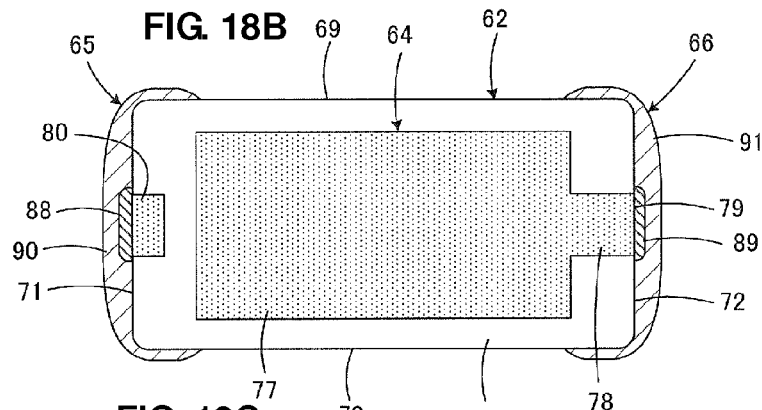

The internal electrodes include a plurality of first internal electrodes 63 illustrated in FIG. 18A and a plurality of second internal electrodes 64 illustrated in FIG. 18B. The plurality of first internal electrodes 63 and the plurality of second internal electrodes 64 are alternately arranged in the direction in which the ceramic layers 73 of the ceramic body 62 are stacked.

The first internal electrodes 63 each include an opposing portion 74 that opposes the second internal electrodes 64 adjacent thereto and a led out portion 75 that is led out from the opposing portion 74 to the first end surface 71. The led out portion 75 provides an exposed end 76 that is exposed at the end surface 71. On the other hand, the second internal electrodes 64 each have an opposing portion 77 that opposes the first internal electrodes 63 adjacent thereto and a led out portion 78 that is led out from the opposing portion 77 to the second end surface 72. The led out portion 78 provides an exposed end 79 that is exposed at the end surface 72.

For the same reason as in the first preferred embodiment, it is preferable that the width dimension of the led out portions 75 and 78 be smaller than the width dimension of the opposing portions 74 and 77.

The material and thickness of each of the internal electrodes 63 and 64 can be the same as those in the above-described first preferred embodiment.

In addition to the above-described internal electrodes 63 and 64, inner layer dummy electrodes 80 and 81 and outer layer dummy electrodes 82 and 83, which are preferably composed of the same material as the internal electrodes 63 and 64, are arranged inside the ceramic body 62. The inner layer dummy electrodes 80 and the outer layer dummy electrodes 82 are exposed at the first end surface 71 and the inner layer dummy electrodes 81 and the outer layer dummy electrodes 83 are exposed at the second end surface 72.

It is preferable that the width dimension (dimension in direction W) of the exposed end of each of the inner layer dummy electrodes 80 and 81 and the outer layer dummy electrodes 82 and 83 be the same or substantially the same as the width dimension of the exposed ends 76 and 79 of the led out portions 75 and 78 of the internal electrodes 63 and 64. In addition, it is preferable that the exposed ends 76 of the internal electrodes 63, exposed ends of the inner layer dummy electrodes 80 and exposed ends of the outer layer dummy electrodes 82 line up with one another at the end surface 71 in the direction T. Similarly, it is preferable that the exposed ends 79 of the internal electrodes 64, exposed ends of the inner layer dummy electrodes 81 and exposed ends of the outer layer dummy electrodes 83 line up with one another at the end surface 72 in the direction T.

The outer layer dummy electrodes 82 and 83 respectively have small-width portions 84 and 85 that are led out to the end surfaces 71 and 72, and large-width portions 86 and 87 that are connected to the small-width portions 84 and 85. The outer layer dummy electrodes 82 and 83 are arranged such that the large-width portions 86 and 87 oppose each other in the same plane. The large-width portions 86 and 87 of the outer layer dummy electrodes 82 and 83 have a shielding effect of relaxing an electric field that is concentrated between edges of the wrapped around portions of the external electrodes 65 and 66 that wrap around onto the principal surfaces 67 and 68 and the side surfaces 69 and 70, and the internal electrodes 63 and 64 in the outermost layers.

The external electrodes 65 and 66 both include a first conductive portion and a second conductive portion. Hereafter, each of these components will be described.

As illustrated in FIG. 17 and FIGS. 18A to 18C, first conductive portions 88 and 89 are respectively arranged on the end surfaces 71 and 72 of the ceramic body 62 so as to cover the exposed ends 76 and 79 of the internal electrodes 63 and 64 and so as to cover the exposed ends of the inner layer dummy electrodes 80 and 81 and the exposed ends of the outer layer dummy electrodes 82 and 83. The first conductive portions 88 and 89 do not wrap around onto the principal surfaces 67 and 68 and the side surfaces 69 and 70.

As the material of the first conductive portions 88 and 89, a base metal such as Cu or Ni can preferably be used. In addition, the first conductive portions 88 and 89 can include a glass component. Furthermore, the first conductive portions 88 and 89 may be formed by direct plating, for example. In this case, a glass component is usually not included in the first conductive portions 88 and 89.

Second conductive portions 90 and 91 are respectively arranged on the end surfaces 71 and 72 so as to cover the first conductive portions 88 and 89. In addition, the second conductive portions 90 and 91 are arranged so as to wrap around onto the principal surfaces 67 and 68 and the side surfaces 69 and 70.

As the material of the second conductive portions 90 and 91, noble metals such as Ag, Pd, Ag—Pd, Au and Pt can preferably be used, for example. In addition, the second conductive portions 90 and 91 can include a glass component.

In the multilayer ceramic capacitor 61 according to the present preferred embodiment, the second conductor portions 90 and 91 define the outermost layers of the external electrodes 65 and 66. This is because the multilayer ceramic capacitor 61 is mounted preferably by using a conductive adhesive. In this case, the outermost layer of the external electrodes 65 and 66 is not formed of a Sn plating film but is rather formed of a noble metal, for example.

Twelfth Preferred Embodiment

Figure 18C:
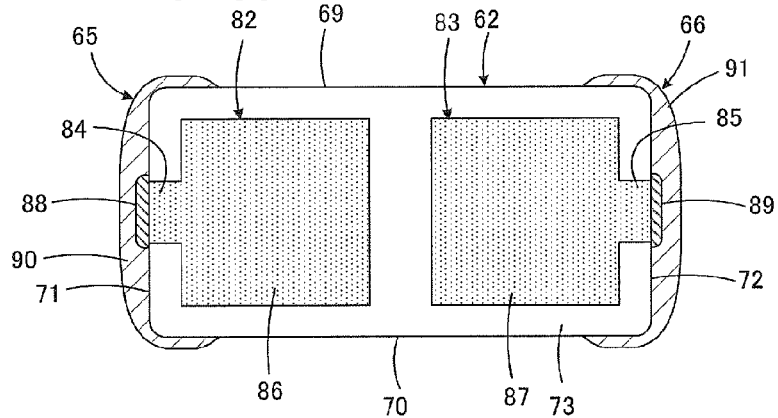
Figure 19A:
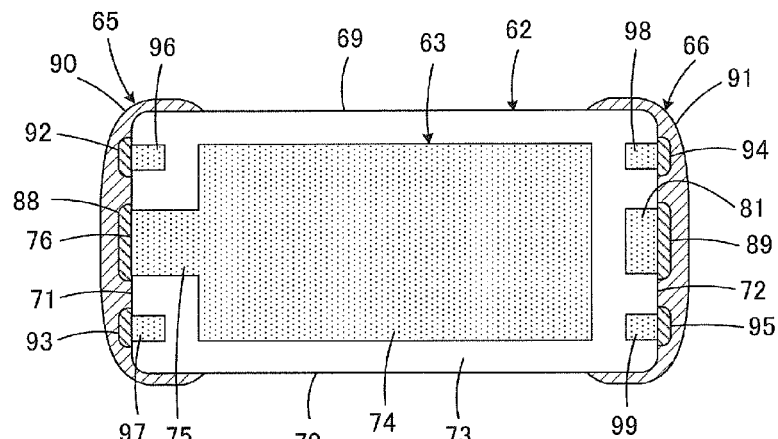
FIGS. 19A to 19C illustrate a multilayer ceramic capacitor according to a twelfth preferred embodiment of the present invention and are figures that correspond to FIGS. 18A to 18C.
Figure 19B:
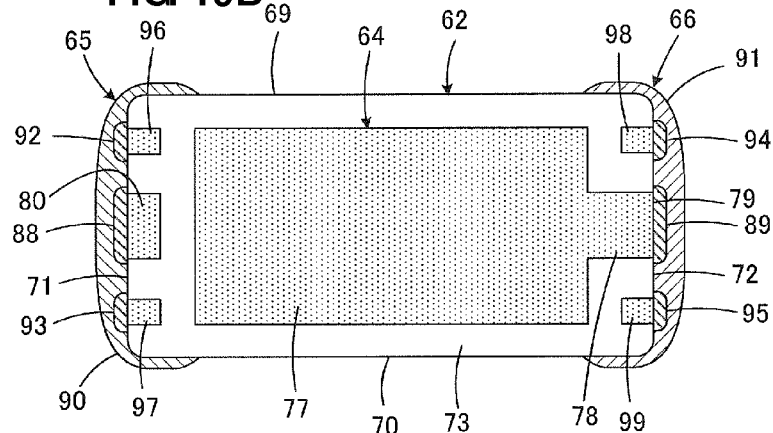
Figure 19C:
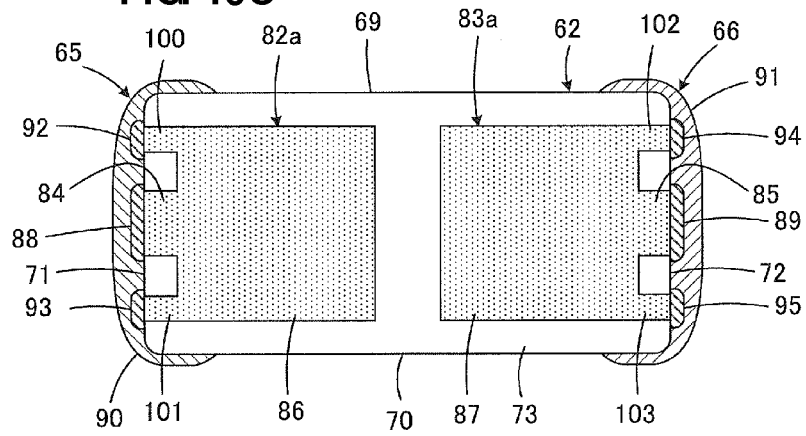

A twelfth preferred embodiment of the present invention is illustrated in FIGS. 19A to 19C. FIGS. 19A to 19C correspond to FIGS. 18A to 18C. In FIGS. 19A to 19C, elements corresponding to those illustrated in FIGS. 18A to 18C are denoted by the same reference symbols and repeated description thereof will be avoided.

A multilayer ceramic capacitor 61*a* illustrated in FIGS. 19A to 19C, in short, has a structure obtained by adding protruding portions 92 to 95 to the multilayer ceramic capacitor illustrated in FIGS. 18A to 18C. In addition, so as to respectively correspond to the protruding portions 92 to 95, inner layer dummy electrodes 96 to 99, which are respectively connected to the protruding portions 92 to 95, are added and led out portions 100 to 103 are additionally provided in the outer layer dummy electrodes 82a and 83a. The inner layer dummy electrodes 96 to 99 are preferably made of the same material as the internal electrodes 63 and 64.

In more detail, the inner layer dummy electrodes 96 and the led out portion 100 are connected to the protruding portion 92, the inner layer dummy electrodes 97 and the led out portion 101 are connected to the protruding portion 93, the inner layer dummy electrodes 98 and the led out portion 102 are connected to the protruding portion 94, and the inner layer dummy electrodes 99 and the led out portion 103 are connected to the protruding portion 95.

The structure illustrated in FIGS. 19A to 19C is effective in a case where the first conductive portions 88 and 89 and the protruding portions 92 to 95 are formed using direct plating.

Other Preferred Embodiments

The present invention is not limited to the above-described preferred embodiments of multilayer ceramic capacitors and can also be applied to other multilayer ceramic electronic components. For example, in a case where a ceramic body is formed of a piezoelectric ceramic, the ceramic body can be used in a multilayer ceramic electronic component that functions as a piezoelectric component, in a case where a ceramic body is formed of a semiconductor ceramic, the ceramic body can be used in a multilayer ceramic electronic component that functions as a thermistor, and in a case where a ceramic body is formed of a magnetic ceramic, the ceramic body can be used in a multilayer ceramic electronic component that functions as an inductor. In the case of an inductor, the internal electrodes preferably are coil-shaped conductors, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a ceramic body including a pair of opposing principal surfaces, a pair of opposing side surfaces, a pair of first and second opposing end surfaces, and a plurality of ceramic layers that extend in a direction in which the principal surfaces extend and are stacked in a direction of a line that connects the pair of principal surfaces, a dimension of the end surfaces in a direction of a line that connects the pair of side surfaces is smaller than a dimension of the side surfaces in a direction of a line that connects the pair of end surfaces;
a first internal electrode that is arranged inside the ceramic body and that includes a first led out portion that provides an exposed end that is exposed at the first end surface, and a first opposing portion;
a second internal electrode that is arranged inside the ceramic body and that includes a second led out portion that provides an exposed end that is exposed at the second end surface opposed to the first end surface, and a second opposing portion opposed to the first opposing portion;
an external electrode that is arranged on one of the first and second end surfaces so as to be electrically connected to one of the first and second internal electrodes; wherein
the external electrode includes a first conductive portion that is arranged on the one of the first and second end surfaces so as to cover the exposed end of one of the first and second led out portions and so as not to wrap around onto the side surfaces, and includes a second conductive portion that is arranged on the one of the first and second end surfaces so as to cover the first conductive portion and so as to wrap around onto the principal surfaces and the side surfaces;
the external electrode does not include any insulating layers, nor are any insulating layers arranged between the first and second internal electrodes and the external electrode;
a width of the first led out portion is less than a width of the first opposing portion and a width of the second led out portion is less than a width of the second opposing portion;
the external electrode further includes a third conductive portion that wraps around and encapsulates all exposed portions of the second conductive layer;
the external electrode includes a protruding portion that is arranged on the one of the first and second end surfaces so as to be adjacent to the first conductive portion with a predetermined distance therebetween;
the protruding portion is electrically connected to the one of the first and second internal electrodes only through the first, second, and third conductive portions; and
the protruding portion is spaced away from the first led out portion or the second led out portion exposed at the one of the first and second end surfaces.

2. The multilayer ceramic electronic component according to claim 1, wherein the second conductive portion covers the first conductive portion and the protruding portion.

3. The multilayer ceramic electronic component according to claim 1, wherein, on a single one of the first and second end surfaces, there is provided one of the first conductive portion and a plurality of the protruding portions, and the plurality of protruding portions are arranged at positions that are symmetric to each other about the first conductive portion serving as a center.

4. The multilayer ceramic electronic component according to claim 1, wherein a thickness of the protruding portion in a direction of a line that connects the first and second end surfaces is equal to or larger than a thickness of the first conductive portion.

5. The multilayer ceramic electronic component according to claim 1, wherein the protruding portion is made of a same material as that of the first conductive portion.

6. The multilayer ceramic electronic component according to claim 5, further comprising a dummy electrode that is arranged inside the ceramic body, that has an exposed end that is exposed at the one of the first and second end surfaces and is covered by the protruding portion, and that is made of a same material as that of the first and second internal electrodes.

7. The multilayer ceramic electronic component according to claim 1, wherein the first conductive portion is made of a material that includes a resistive component.

8. A multilayer ceramic electronic component comprising:
a ceramic body including a pair of opposing principal surfaces, a pair of opposing side surfaces, a pair of first and second opposing end surfaces, and a plurality of ceramic layers that extend in a direction in which the principal surfaces extend and are stacked in a direction of a line that connects the pair of principal surfaces;
a first internal electrode that is arranged inside the ceramic body and that includes a first led out portion that provides an exposed end that is exposed at a the first end surface, and a first opposing portion;

a second internal electrode that is arranged inside the ceramic body and that includes a second led out portion that provides an exposed end that is exposed at the second end surface opposed to the first end surface, and a second opposing portion opposed to the first opposing portion; and an external electrode that is arranged on one of the first and second end surfaces so as to be electrically connected to one of the first and second internal electrodes; wherein the external electrode includes a first conductive portion that is arranged on the one of the first and second end surfaces so as to cover the exposed end of one of the first and second led out portions and so as not to wrap around onto the side surfaces, and includes a second conductive portion that is arranged on the one of the first and second end surfaces so as to cover the first conductive portion and so as to wrap around onto the principal surfaces and the side surfaces;

a dimension of the first and second end surfaces in a direction of a line that connects the pair of side surfaces is larger than a dimension of the side surfaces in a direction of a line that connects the first and second end surfaces;

a portion of the first conductive portion is arranged to overlap a portion of at least one of the pair of principal surfaces;

a width of the first led out portion is less than a width of the first opposing portion and a width of the second led out portion is less than a width of the second opposing portion;

the external electrode further includes a third conductive portion that wraps around and encapsulates all exposed portions of the second conductive layer;

the external electrode includes a protruding portion that is arranged on the one of the first and second end surfaces so as to be adjacent to the first conductive portion with a predetermined distance therebetween;

the protruding portion is electrically connected to the one of the first and second internal electrodes only through the first, second, and third conductive portions; and the protruding portion is spaced away from the first led out portion or the second led out portion exposed at the one of the first and second end surfaces.

* * * * *